(12) United States Patent  
Littleton (10) Patent No.: US 8,906,166 B2  
(45) Date of Patent: Dec. 9, 2014

(54) PROCESS AND APPARATUS FOR PERFORMING FORCED IMMERSION OSCILLATORY CLEANING

(71) Applicant: Nicholas Glen Littleton, Saratoga, CA (US)

(72) Inventor: Nicholas Glen Littleton, Saratoga, CA (US)

( * ) Notice: Subject to any disclaimer, the term of this patent is extended or adjusted under 35 U.S.C. 154(b) by 0 days.

(21) Appl. No.: 13/964,779

(22) Filed: Aug. 12, 2013

(65) Prior Publication Data

US 2014/0137900 A1  May 22, 2014

Related U.S. Application Data

(60) Provisional application No. 61/728,552, filed on Nov. 20, 2012.

(51) Int. Cl.
| B08B 3/00 | (2006.01) |
| B08B 3/12 | (2006.01) |
| B08B 3/10 | (2006.01) |
| B08B 3/04 | (2006.01) |

(52) U.S. Cl.  
CPC ............ *B08B 3/102* (2013.01); *B08B 3/044* (2013.01)  
USPC .......................................... 134/34

(58) Field of Classification Search  
None  
See application file for complete search history.

(56) References Cited

U.S. PATENT DOCUMENTS

| 6,776,853 B2 * | 8/2004 | Ono et al. ............... 134/30 |
| 2011/0315619 A1 * | 12/2011 | Homon ................ 210/205 |

* cited by examiner

*Primary Examiner* — Nicole Blan  
*Assistant Examiner* — Pradhuman Parihar  
(74) *Attorney, Agent, or Firm* — Cozen O'Connor (57) ABSTRACT

An open top tank assembly and process for performing forced immersion oscillatory cleaning of products, parts, assemblies or other materials with or without non-line of sight (NLOS) features, wherein the process is repeated during application of pressure gradients to the fluid in the tank to develop a consistent rhythmic oscillation that creates movement of product in a center cavity of the tank to repeatedly transfer the fluid through the product to clean the product.

9 Claims, 9 Drawing Sheets

PROCESS AND APPARATUS FOR PERFORMING FORCED IMMERSION OSCILLATORY CLEANING

CROSS-REFERENCE TO RELATED APPLICATIONS

This application claims priority from U.S. Provisional Application Ser. No. 61/728,552 filed Nov. 20, 2012, the content of which is hereby incorporated by reference in its entirety.

BACKGROUND OF THE INVENTION

1. Field of the Invention

The present invention relates to cleaning processes and, more particularly, to a cleaning or surface treatment process and associated tank assembly for implementing the process.

2. Description of the Related Art

It is known that the thorough cleaning of commercial kitchen exhaust hood filters is a difficult task with the conventional equipment solutions and best practices in the market place. Commercial kitchen exhaust hood filters, or hood filters, are designed in such that the filter has areas of grease accumulation from the grease laden vapors of cooking that are not in a clear line of sight to operators of cleaning equipment. These non-line of site (NLOS) areas, or critical areas, of the filter are the primary area of shear in the air flow as the grease laden vapor passes through the filter and subsequently are the areas that accumulate the most grease deposits. For hood filters to function properly, these critical areas need to be free from grease accumulation.

As hood filters accumulate grease, two things start to happen. First, the filter becomes less efficient and allows more grease vapors to pass through. This will in turn allow for more grease deposits to accumulate on the duct work and the exhaust fan that is usually on the roof of a restaurant. As grease deposits increase in the duct work and the fan, the efficiency of the entire exhaust system is compromised, and there is an increase in fire hazard from the accumulation. Second, as grease accumulates in the critical area of a filter, the accumulated grease reduces the volume of air that can be exhausted or removed from the kitchen. This will lead to cooking vapors/smoke accumulation in the kitchen and will impact the air balance (e.g., make-up air (MUA) or heating ventilation/air conditioning (HVAC)) of the facility. Both of these situations can be avoided with clean hood filters and proper cleaning protocols set forth by the restaurant or commercial kitchen.

Cleaning hood filters is a common activity for all commercial kitchens. The conventional methods of cleaning these hood filters is either laborious or ineffective. Manually cleaning the filters by hand is not a desirable duty and takes quite a bit of time to perform thoroughly. Many commercial kitchens that have industrial dishwashers will place the filters in the dishwashers and run them through. While this process appears to clean the filter, it in fact does not thoroughly clean the filter. Due to the NLOS features of the filters, 1 and 2 degree sprays of commercial dishwashers cannot contact the critical area of the filter where the majority of the grease has accumulated. Hence, a filter will look clean to the eye, but will have hidden accumulation in the critical area and will not perform as well as a completely clean filter. Many commercial kitchens will subcontract the cleaning of filters out to service organizations. These hood cleaning companies (HCC) utilize a couple of techniques to clean filters thoroughly. For example, many HCCs use caustic soak tanks. This process involves simply placing the filter in a bath of caustic water and allowing the caustic water to completely dissolve the grease. While effective in cleaning the filter, this process takes several hours or even days to work, and most HCCs do not have the time to wait on this process. Another exemplary process involves pressure washing. Here, the HCC uses a high pressure washer to spray the filters. This process is marginally effective but is very time consuming, and requires a large area to perform the work because of high pressure spray splash. In order to clean a hood filter properly, the critical area of the filter must have all the grease removed. As previously mentioned, this critical area is not visible, hence the challenge of cleaning this area well.

It is also known that several other industrial cleaning applications, where NLOS issues persist, could be satisfied with this process and equipment solution. Some examples of this are complex castings or machined parts, which are becoming more common place with the advent of 3D scanning technology and advanced computer aided numerical controlled (NC) machining. Most complicated castings and machined parts need cleaning, and current spray booths or dunk tanks used in cleaning these parts have the same issues as hood filters. Spray booths only have 1 or 2 degree spray trajectories and dunk tanks take many hours to work properly.

It is also known that several products need surface treatments on NLOS areas, such as acid etching or anodizing. The same issues of cleaning NLOS apply to surface treatment of NLOS. Sprays cannot see the feature and dunk tanks take a long time.

Also known as is a fluids or other based process, where this forced immersion with oscillation process can be applied that acts not as a cleaning process, but a process to achieve other objectives.

SUMMARY OF THE INVENTION

Disclosed is a cleaning or surface treatment process and associated tank assembly for implementing the process. The disclosed process is liquid based and can be used with, liquid solutions, such as, aqueous caustic, biological (enzyme based or other), solvents and acids. Due to non-line of site (NLOS) processing, liquids may need to be forced or channeled to flow through the areas that cannot be seen. In an embodiment, the process accomplishes this by forcing a membrane around the product (hood filter, stack of filters or industrial part), which will act as the liquid channeling feature of the device. This membrane can be pressurized, which forces the membrane to conform to the product being cleaned and thereby form a very tight interface to the outside surface of the product. This interface can prevent liquids from flowing around the product and forces the liquids to flow though the product. In order to create the pressure that will force the membrane to conform to the product, the membrane may be sealed. The top seal of the membrane in this process can be achieved mechanically by various methods, including clamping the membrane between two flat surfaces on the top of an open tank. A bottom seal can be accomplished by attaching the bottom of the membrane to a rigid frame provided inside the cleaning tank that is then submerged under the working fluid. The submersion of the membrane creates the seal at the bottom of the tank.

After the tank is filled to an appropriate level with working fluid, air or other gas pressure is applied to the membrane from a feed through on the outside of the tank, where the membrane will conform to what is inside the membrane. Once the membrane is conformed, continued pressure is added to the working fluid that is forced out of the area between the tank and the membrane and forced into the center cavity of the tank at which the products are located. As continued pressure is added to the working fluid, the rigid frame to which the membrane is attached will start to be pushed up and out of the tank. This upward pushing of the rigid frame will continue until the working fluid level is forced beyond the bottom of the rigid frame, at which time a large escape of air or other gas will be discharged from under the rigid frame. As the air or gas escapes under the rigid frame, it will "fall" back down within the center cavity of the tank. The process is then repeated as the pressure gradients fluctuate, thus a consistent rhythmic oscillation is developed. This oscillation of the rigid frame due to escaping air or gas creates a tidal type movement of the rigid frame and products in the center cavity of the tank and, hence, acts as a forced immersion process where the working fluid is repeatedly transferred through the product. In addition, as the air or gas escapes under the rigid frame and works its way to the surface of the working fluid, the air will act as an air sparge and increase the function of the process.

It should be noted that the forced immersion process is active. Consequently, the tank is connected to a pump that will recirculate the working fluid from the bottom of the tank and into the center cavity. This process will amplify the forced immersion oscillation by adding a significant flow rate of working fluid through the product being cleaned.

While the forced immersion oscillation and a recirculation pump are activated, an additional agitation force is added. This agitation force is accomplished by attaching a mechanical, hydraulic, pneumatic or electrical, vibration inducer to the bottom of the rigid frame. While the forced immersion process is active, the rigid frame is not in contact with the bottom of the tank. This allows for a mechanical vibration inducer to transfer all its energy into the rigid frame and products being cleaned. The pressurized membrane acts as a mechanical tether that holds the vibration inducer, rigid frame and products in the center of the tank.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Various embodiments are disclosed in the following detailed description and the accompanying drawings, in which.

DETAILED DESCRIPTION OF THE EXEMPLARY EMBODIMENTS

The following detailed description of specific embodiments of the inventive subject matter will be better understood when read in conjunction with the appended drawings. As used herein, an element or step recited in the singular and proceeded with the word "a" or "an" should be understood as not excluding plural of said element or step, unless such exclusion is explicitly stated. Furthermore, references to "embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1A:
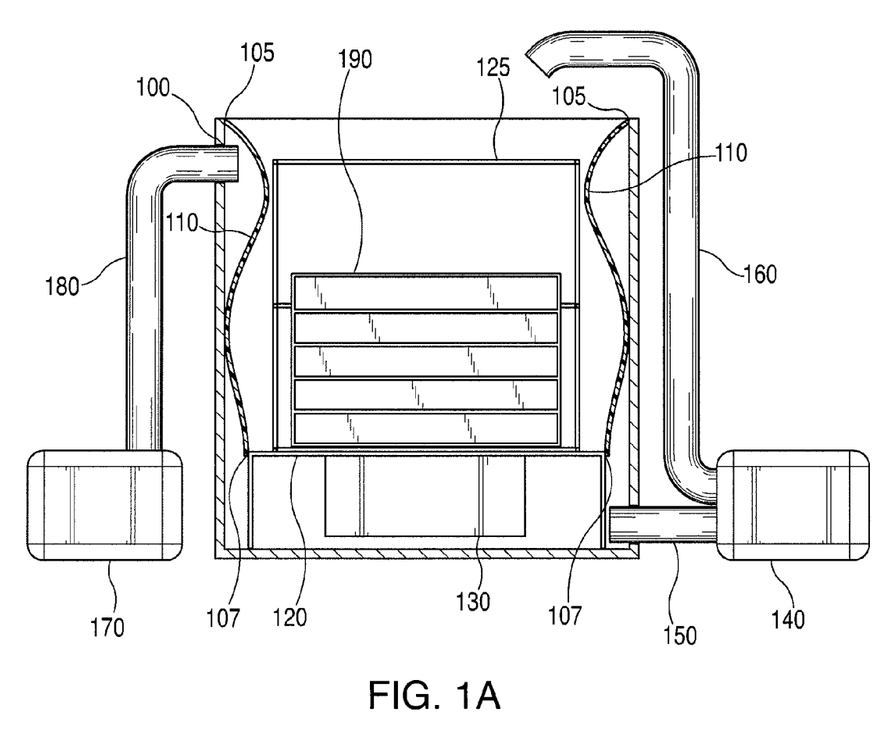
FIG. 1A is a cross-sectional side view depicting the major components of the cleaning tank in accordance with the invention.

FIG. 1A is a schematic of an open top tank assembly that may be used as a device to clean or treat products, parts, assemblies or other materials with or without non-line of sight (NLOS) features in accordance with an embodiment of the invention. As shown in a cutaway side view of the device in FIG. 1A and top view FIG. 1B, a tank assembly includes a tank 100. The tank 100 can be made of but not limited to various plastics including polyethylene (PE) and high density polyethylene (HDPE) and various metals including stainless steel (SST). The tank 100 includes a membrane 110 attached and sealed to the top of the tank 100 with a membrane to tank seal 105. This membrane 110 can be constructed of an air tight or porous fabric, sheet product laminate or combination of material to provide the membrane, such as a poly vinyl chloride (PVC) coated nylon fabric. The membrane 110 is sealed around the entire perimeter of the top of the tank 100 with the membrane to tank seal 105 in an air tight manner (see FIG. 1A). The membrane 110 is also sealed to rigid frame 120 with the membrane to rigid frame seal 107. The rigid frame 120 is disposed at the bottom of the cleaning tank 100.

Figure 1B:
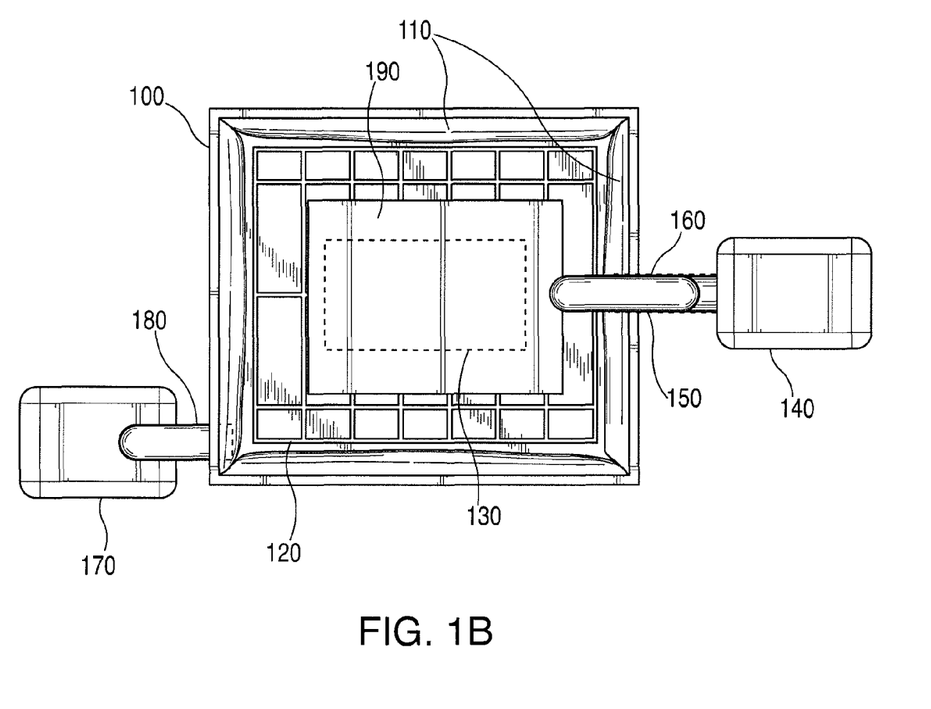
FIG. 1B is a top view of a cleaning tank and associated components of the cleaning tank.
Figure 2A:
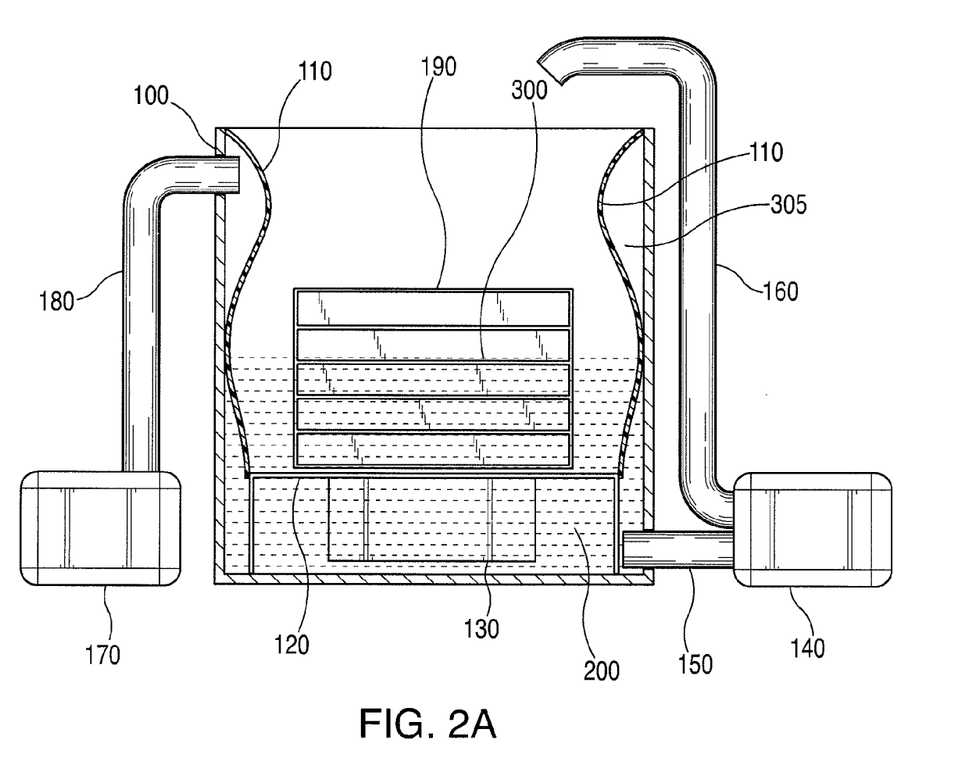
FIG. 2A is a side view of the cleaning tank of FIG. 1B with the associated components including working fluid which depicts the working fluid in a neutral state with no active pressurization of the membrane in accordance with an embodiment of the invention.

With further reference to FIGS. 1A and 1B, attached to the rigid frame 120 is a vibration inducer 130. The vibration inducer 130 can be electrical, hydraulic or pneumatic in driven energy input. Arranged on top of the rigid frame 120 is the product 190 to be cleaned comprising one or several parts, assemblies or items with or without NLOS features. The product 190 can be placed on the rigid frame 120 as a free item or can be placed in a rigid frame basket 125, or other type of rigid insert. The rigid frame basket 125 can be made of but is not limited to HDPE or SST. The purpose of the rigid frame basket 125 is to allow for multiple products (perhaps smaller in size) to be place in the tank 100 in an organized manner. The rigid frame basket 125 can be porous to allow for unimpeded flow of the working fluid 200 (see FIG. 2).

With further reference to FIGS. 1A and 1B, attached to the tank 100 is a high or low pressure air or gas feed hose 180. Air or gas flow rates and pressure can be regulated to provide a desired oscillation frequency. This air or gas hose 180 can be rigid or flexible and requires an air tight seal at the cleaning tank 100. Attached to the air or gas feed hose 180 is a pump 170, such as an air or gas pump or blower. In alternate embodiments, the pump is a squirrel cage blower, a rotary vane type pump, or other type of blower or pump. Air or gas flow rates and pressures of the pumps depend on the working gas and associated configurations of the tank 100 and membrane 110. Attached to the tank 100, or other container of working fluid 200 (see FIG. 2A), is the working fluid suction pipe 150. This pipe is attached to the tank such as in the lower, areas of the tank 100, to ensure a submerged inlet port to the pipe. The suction pipe 150 is connected to a working fluid pump 140, such as a centrifugal, self-priming or other type of fluid transfer pump and could be made of a material such as SST, cast iron, composites or plastic. The working fluid pump 140 is connected to a return pipe 160 (see FIG. 2A) which transports the working fluid 200 (see FIG. 2A) from the pump 140 and feeds the top of the tank 100.

FIG. 1B thus provides a top view of the open top tank assembly in accordance with the disclosed embodiments of the invention. The rigid frame 120 is porous or grid like in construction so as to permit the working fluid 200 to flow from the top of the tank 100 to the bottom as feed by the return pipe 160.

FIG. 2A is a side view of the tank 100 of FIGS. 1A and 2B tank 100 of FIGS. 1A and 1B with the introduction of working fluid 200 into the tank 100 without a pressurized membrane 110. Here, the working fluid 200 fills the center cavity 300 of the tank equally with the non-pressurized outer cavity 305 during initial fill. The working fluid is filled to a level consistent with the size of the tank 100 and amount of product 190 that is to be interacted with.

Figure 2B:
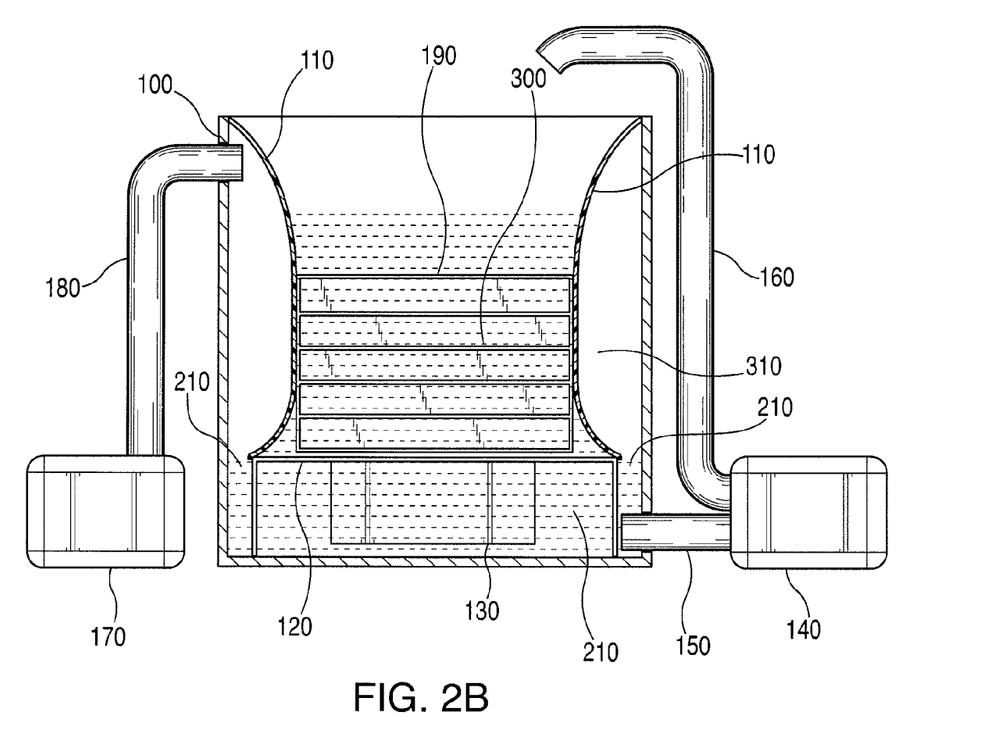
FIG. 2B is a side view of the cleaning tank of FIG. 1B with the associated components including the working fluid depicted in an initial state of pressurization of the membrane.

FIG. 2B is a side view of the tank 100 of FIGS. 1A and 1B with initial pressurization state of the outer cavity 310 achieved with the air or gas pump 170. This initial pressurization will force the working fluid 200 to a working fluid initial pressure state 210. During this initial working fluid pressure state 210, the working fluid 200 is pushed out of the initial pressurization outer cavity state 310 and into the center cavity 300 of the tank 100.

Figure 2C:
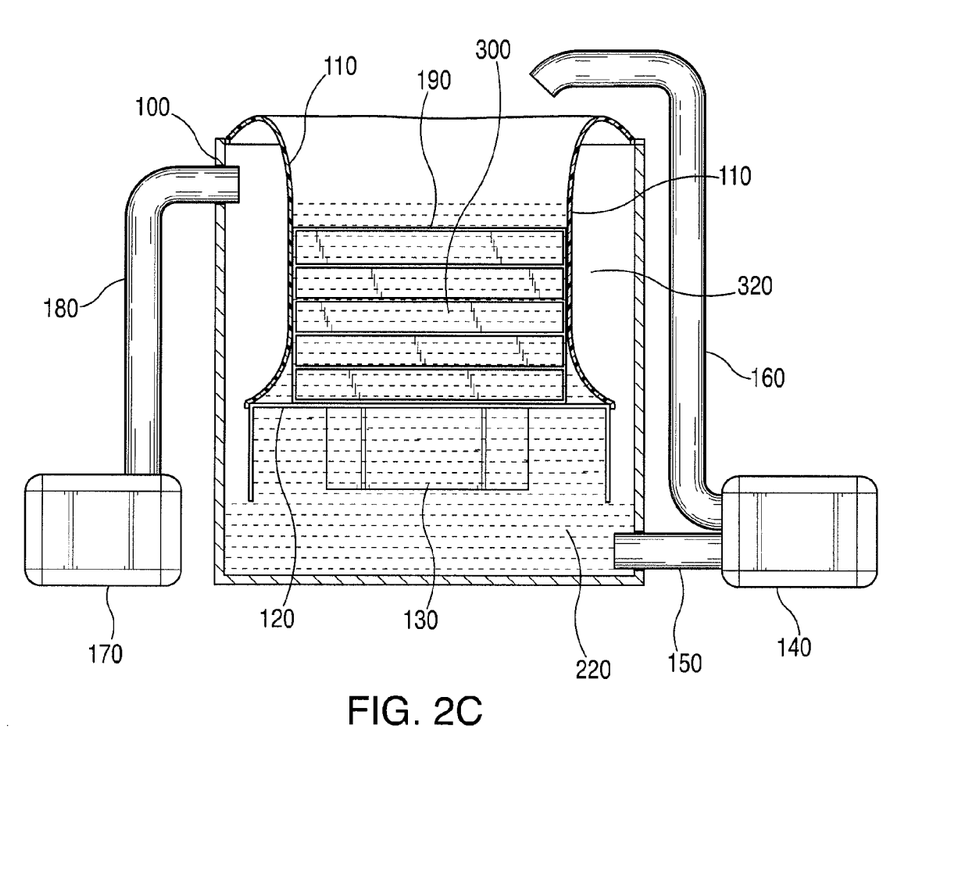
FIG. 2C is a side view of the cleaning tank of FIG. 1B with the associated components including the working fluid depicted in an advanced pressurization state with rigid frame elevation.

FIG. 2C is a side view of the tank 100 of FIGS. 1A and 1B with a high pressure state of outer cavity 320. This state forces the rigid frame 120, vibration inducer 130 and the product 190 to rise up off the bottom of the tank 100. The membrane 110 is pressurized tightly against the product 190, or rigid frame basket 125 which creates a confined channel for the working fluid.

Figure 2D:
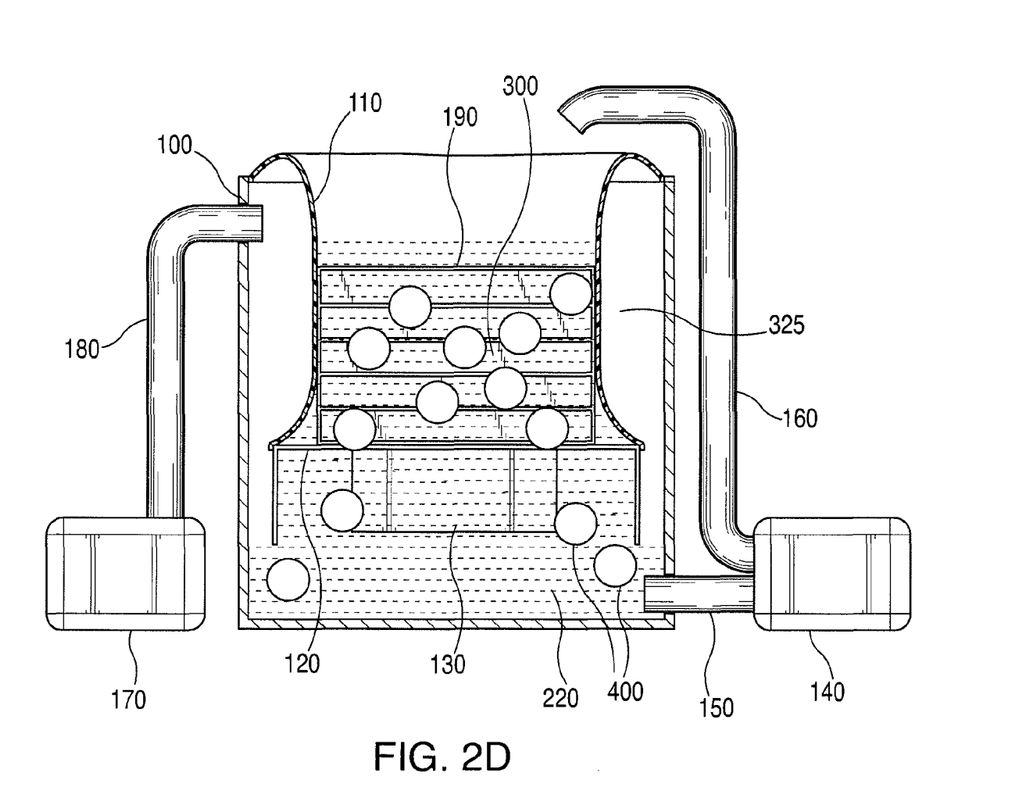
FIG. 2D is a side view of the cleaning tank of FIG. 1B with the associated components including the working fluid depicted in advanced pressurization state, with the rigid frame in an elevated position and air or gas discharge state.

FIG. 2D is a side view of the tank 100 of FIGS. 1A and 1B with a terminal pressure state of the outer cavity 325, the rigid frame 120 and vibration inducer 130 and product 190, with or without rigid frame basket 125 risen off the bottom of the tank 100. At this terminal pressure state, the air or gas discharges under the rigid frame and creates bubbles 400 which rise to the level of the working fluid. This discharge will drop the pressure of the outer cavity relatively quickly, which in turn drops the rigid frame 120 and vibration inducer 130 and product 190 with or without rigid frame basket 125 back down to the bottom of the tank. This discharge of air or gas from under the rigid frame 120 can also create an air or gas sparge effect in a treatment process due to the escaping bubbles 400. This discharge of air or gas pressure causes the rigid frame 120 to drop.

Figure 2E:
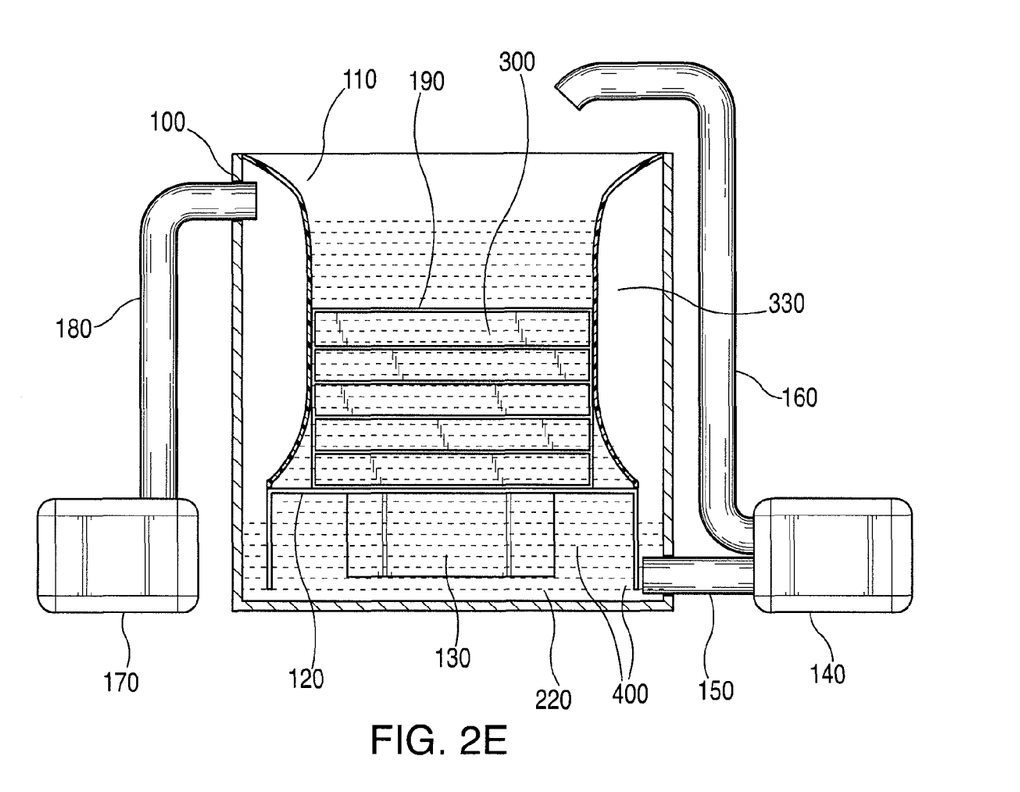
FIG. 2E is a side view of the cleaning tank of FIG. 1B with the associated components including the working fluid depicted in a oscillation state, with the rigid frame in a sunken state and the air or gas in a pressure build state.

FIG. 2E is a side view of the tank 100 of FIGS. 1A and 1B with an oscillation pressurize state of the outer cavity 330. During this state, the rigid frame 120, vibration inducer 130, product 190 with or without rigid frame basket 125, are in a state of oscillation. As the air or gas continue to discharge under the rigid frame 120, the air or gas pump 170 will remain at steady state, and thus continuously pressurizing the out cavity as it discharges. This rhythmic discharge with associated rise and fall of the rigid frame 120, vibration inducer 130, product 190, with or without rigid frame basket 125, creates a steady state oscillation of the center cavity 300. The working fluid level in the center cavity 300 remains somewhat constant while the material inside the center cavity 300 is oscillated with the membrane 110 pressed tightly, thus, flushing the working fluid 200 back and forth through the product 190. This flushing of working fluid 200 inside the membrane 110 creates a forced immersion oscillation of the product 190 in the center cavity 300 of the tank 100.

During the forced immersion oscillation, the vibration inducer 130 is activated. This vibration creates mechanical agitation of the rigid frame 120, and product 190 with or without rigid frame basket 125. During the forced immersion oscillation the membrane 110 suspends the rigid frame 120, vibration inducer 130 and product 190 with or without rigid frame basket 120 and, hence, allows all the mechanical force of the vibration inducer 130 to be transferred into the product 190 directly without wasting mechanical vibration energy of the entire tank 100.

In accordance with disclosed embodiments of the invention, during the forced immersion oscillation, the working fluid pump 140 recycles the working fluid 200 from the bottom of the tank 100 to the center cavity 300. The working fluid is suctioned with the suction pipe 150 and discharged into the center cavity 300 with the discharge pipe 160.

Figure 3:
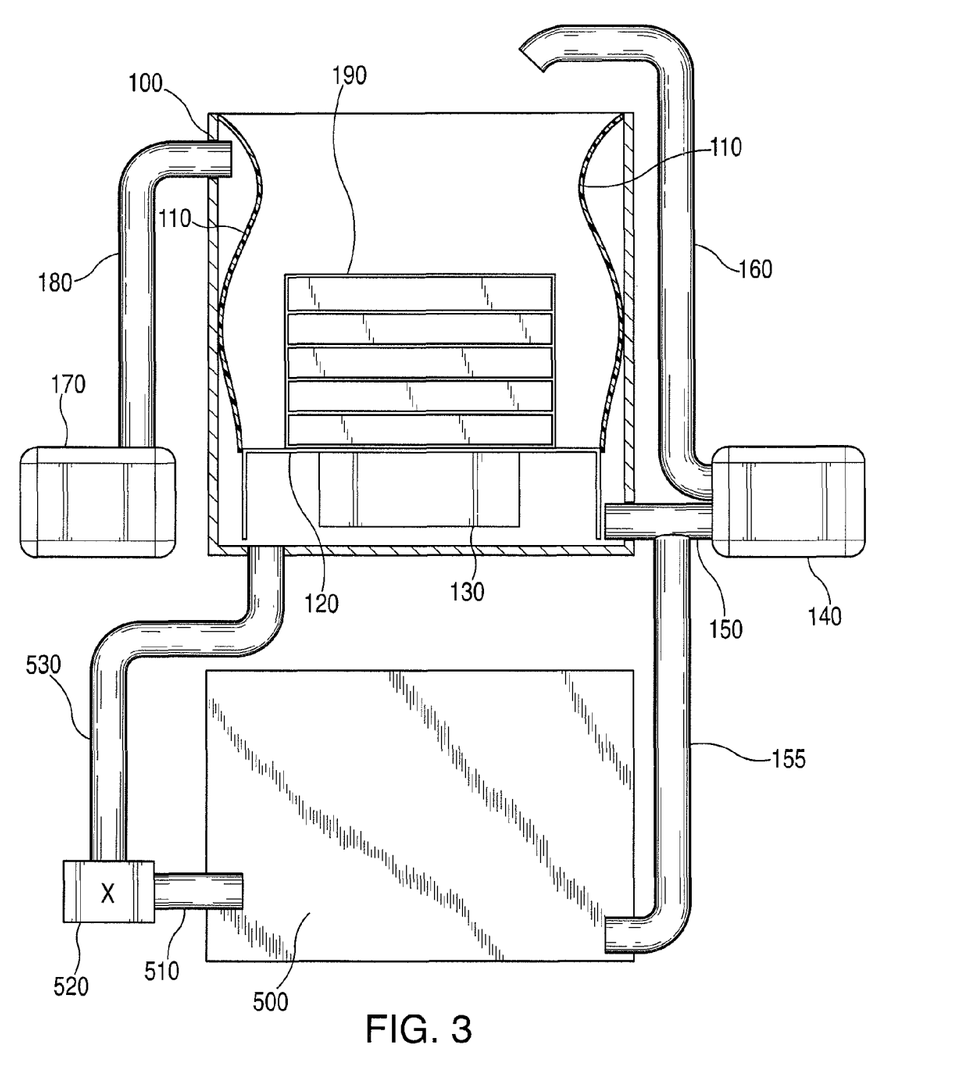
FIG. 3 is a side view of a cleaning tank in accordance with an alternative embodiment of the invention.

The disclosed embodiments of the invention are not limited to single tank configurations and the pumping of both working fluid 200 and air or gas can be supplied in a variety of ways. For example, as shown in FIG. 3 a dump tank 500 is provided. The purpose of this dump tank 500 is to act as a reservoir for the working fluid 200 during a secondary process, such as a rinse, to the product 190. This dump tank 500 can be isolated from the tank 100 with a dump tank valve 520. The dump tank 500 could be connected to the tank 100 with a dump line 530 and a dump inlet 510. The working fluid pump 140 could be manifolded to allow for suction from multiple sources including the dump tank 500 as shown with auxiliary working fluid pump feed line 155. The working fluid pump 140 could also be manifolded on the discharge side of the pump to allow for pump out to an external drain of both the tank 100 and dump tank 500. The discharge side of the pump can also be connected to a separate hose that could be used to spray working fluid from either tank. These suction and discharge manifolds could include connection to an auxiliary tank either stand alone or integrated.

Figure 4:
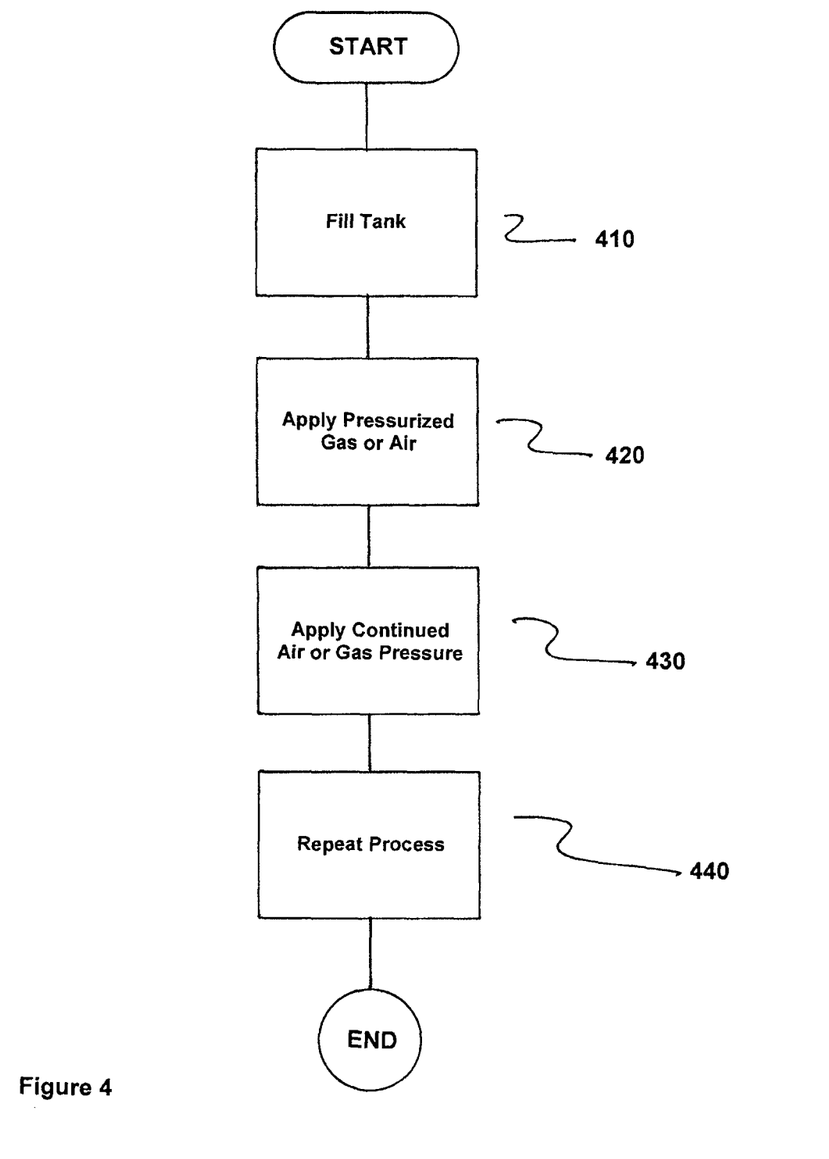
FIG. 4 is a flowchart of the process in accordance with the invention.

FIG. 4 is a flowchart of the process in accordance with the invention. The method comprises filling the tank with a fluid, as indicated in step 410. The tank includes a membrane that is sealed about the upper open perimeter of the tank via a first seal and receives product to be cleaned in the fluid, where the rigid frame is also sealed at the bottom of the tank via a second seal.

Next, pressurized air or gas is applied to the membrane via a first pump in communication with the tank via a first hose to cause the membrane to conform to the product arranged in the tank, as indicated in step 420. Air or gas pressure is continuously applied to fluid that is forced out of the area between the tank and the membrane and that is forced into the center cavity of the tank to force the rigid frame to rise upward toward the upper open perimeter of the tank until the level of the fluid level is forced beyond the bottom of the rigid frame, as indicated in step 430. Applying the air or gas pressure in this manner causes the air or gas to be discharged from under the rigid frame such that the rigid frame returns downward to the bottom of the tank within the center cavity of the tank. The process is repeated during pressure gradient fluctuations to develop a consistent rhythmic oscillation that creates movement of the rigid frame and product in the center cavity of the tank to repeatedly transfer the fluid through the product to clean the product, as indicated in step 440.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for performing forced immersion oscillatory cleaning of product arranged in a tank, a rigid frame being arranged at a bottom of the tank, the method comprising:

filling the tank with a fluid, the tank including a membrane sealed about an upper open perimeter of the tank via a first seal and receiving the product to be cleaned in the fluid, the rigid frame being further sealed at a bottom of the tank via a second seal;

applying pressurized air or gas to the membrane via a first pump in communication with the tank via a first hose to cause the membrane to conform to the product arranged in the tank;

applying continued air or gas pressure to fluid forced out of an area between the tank and the membrane and forced into a center cavity of the tank to force the rigid frame to rise upward toward the upper open perimeter of the tank until a level of the fluid level is forced beyond a bottom of the rigid frame, the air or gas being discharged from under the rigid frame such that the rigid frame returns downward to the bottom of the tank within the center cavity of the tank; and repeating the process during pressure gradient fluctuations to develop a consistent rhythmic oscillation which creates a movement of the rigid frame and product in the center cavity of the tank to repeatedly transfer the fluid through the product to clean said product.

2. The method of claim 1, further comprising:

recirculating the fluid from the bottom of the tank into the center cavity via a second pump in communication with the fluid via an inlet suction pipe fixedly attached to the tank at a lower area to submerge the inlet suction pipe in the fluid, the second pump having a return pipe extending to the upper open perimeter of the tank for returning the fluid to tank.

3. The method of claim 2, wherein the second pump is one of a centrifugal pump, a self-priming pump and other type of fluid transfer pump.

4. The method of claim 1, further comprising:

applying a mechanical, vibrational force to the rigid frame via a vibration inducer fixedly attached to the rigid frame.

5. The method of claim 4, wherein the vibration inducer is one of electrical, hydraulic and pneumatic in driven energy input.

6. The method of claim 1, wherein the membrane is an air tight fabric comprising a poly vinyl chloride (PVC) coated nylon fabric, a laminate and other combination of materials; and wherein the membrane is sealed to the tank in an airtight manner.

7. The method of claim 1, wherein the first hose is a high or low pressure air or gas feed hose and is sealed at the tank in an air tight manner.

8. The method of claim 1, wherein the first pump is an air or gas pump or blower.

9. The method of claim 1, wherein the first pump is one of a squirrel cage blower, a rotary vane type pump, root pump and other type of air pump or gas pump.

\* \* \* \* \*